(12) United States Patent
Durand

(10) Patent No.: US 6,945,591 B2
(45) Date of Patent: Sep. 20, 2005

(54) STORAGE BOX FOR A PICKUP TRUCK FORMED FROM METALLIC AND COMPOSITE MATERIALS

(75) Inventor: Robert D. Durand, Lancaster, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/607,507

(22) Filed: Jun. 26, 2003

(65) Prior Publication Data

US 2004/0026961 A1 Feb. 12, 2004

Related U.S. Application Data

(60) Provisional application No. 60/392,694, filed on Jun. 28, 2002.

(51) Int. Cl.⁷ ............................................. B62D 33/02
(52) U.S. Cl. ............................. 296/183.1; 296/181.3; 296/193.08; 296/203.04; 296/39.2
(58) Field of Search ............................. 296/191, 181.3, 296/183.1, 181.2, 193.08, 203.04, 10, 39.1, 39.2

(56) References Cited

U.S. PATENT DOCUMENTS

| | | | | |
|---|---|---|---|---|
| 2,676,729 A | * | 4/1954 | Ferguson et al. | 220/645 |
| 3,451,452 A | * | 6/1969 | Marshall et al. | 220/646 |
| 3,811,721 A | * | 5/1974 | Bolesky | 296/193.05 |
| 3,955,845 A | | 5/1976 | Werner | |
| 4,139,115 A | * | 2/1979 | Robinson | 220/645 |
| 4,440,434 A | * | 4/1984 | Celli | 296/181.2 |
| 4,976,490 A | * | 12/1990 | Gentle | 296/183.1 |
| 5,403,063 A | * | 4/1995 | Sjostedt et al. | 296/193.07 |
| 5,660,427 A | * | 8/1997 | Freeman et al. | 296/190.08 |
| 5,730,485 A | * | 3/1998 | Sjostedt et al. | 296/181.3 |
| 5,772,276 A | * | 6/1998 | Fetz et al. | 296/181.6 |
| 5,800,003 A | | 9/1998 | Clenet | |
| 5,803,531 A | * | 9/1998 | Nielsen | 296/184.1 |
| 5,975,625 A | * | 11/1999 | Simplicean | 296/205 |
| D425,825 S | | 5/2000 | Shambeau et al. | |
| 6,076,693 A | * | 6/2000 | Reiter et al. | 220/9.1 |
| 6,422,642 B1 | * | 7/2002 | Grimm et al. | 296/181.3 |
| 6,439,649 B1 | * | 8/2002 | Lorenzo et al. | 296/181.3 |
| 6,502,654 B2 | * | 1/2003 | Witte et al. | 180/89.1 |
| 6,523,876 B1 | * | 2/2003 | Durand | 296/35.1 |
| 6,702,365 B2 | * | 3/2004 | Semple et al. | 296/204 |

* cited by examiner

*Primary Examiner*—D. Glenn Dayoan
*Assistant Examiner*—Greg Blankenship
(74) *Attorney, Agent, or Firm*—MacMillan, Sobanski & Todd, LLC

(57) ABSTRACT

A storage box for a pickup truck or similar vehicle is formed from a combination of metallic and composite materials. The storage box includes an internal storage box frame that is formed from a plurality of metallic tubular components that are secured together, such as by magnetic pulse welding techniques. The metallic tubular pieces can be formed from steel, aluminum, and the like, or any combination thereof. The storage box further includes one or more panels that are formed from composite materials, such as urethane, that are secured to the metallic storage box frame. The composite panels may secured to the metallic storage frame box by molding the composite material directly about the metallic storage box frame. Alternatively, the composite panels may be formed as separate pieces that are connected to the metallic storage box frame. The combination of the internal metallic storage box frame and the external composite storage box panels provides a relatively light weight storage box that is resistant to dents and other deformations during use.

14 Claims, 2 Drawing Sheets

US 6,945,591 B2

STORAGE BOX FOR A PICKUP TRUCK FORMED FROM METALLIC AND COMPOSITE MATERIALS

CROSS REFERENCE TO RELATED APPLICATION

This application claims the benefit of U.S. Provisional Application No. 60/392,694, filed Jun. 28, 2002, the disclosure of which is incorporated herein by reference.

BACKGROUND OF THE INVENTION

This invention relates in general to storage boxes for pickup trucks and other vehicles. In particular, this invention relates to an improved structure for such as storage box that is formed from a combination of metallic and composite materials.

Pickup trucks are well known vehicles that include a frame assembly having a front end that supports a cab or similar occupant enclosure and a rear end that supports a flat bed. In many instances, a storage box is mounted on the flat bed to provide a partially or fully enclosed container for retaining articles therein. A typical storage box for a pickup truck includes a generally flat base that is bounded by upstanding walls to form the container. In some instances, one of the upstanding walls may be pivotably supported relative to the other walls to provide a tailgate or similar door-like structure that facilitates the insertion and removal of articles to and from the storage box.

Traditionally, the base and walls of the storage box have been formed exclusively from metallic materials. For example, it is known to provide a plurality of sheets of a metallic material and to stamp or otherwise deform such sheets to desired shapes. Then, the stamped sheets are disposed about and secured to internal metallic reinforcing members to form the storage box. Lastly, the assembled storage box is secured to the frame assembly of the vehicle. Although this structure and method of manufacture has been effective for many years, it has been found that storage boxes that are formed from stamped sheets of metallic materials are relatively heavy in weight, which is undesirable from a fuel economy standpoint. Also, it has been found that storage boxes that are formed from stamped sheets of metallic materials are subject to undesirable dents and other deformations that can occur when articles are inserted therein or removed therefrom. Thus, it would be desirable to provide an improved structure for a storage box for a pickup truck or similar vehicle that avoids these problems.

SUMMARY OF THE INVENTION

This invention relates to an improved structure for a storage box for a pickup truck or similar vehicle that is formed from a combination of metallic and composite materials. The storage box includes an internal storage box frame that is formed from a plurality of metallic tubular components that are secured together, such as by magnetic pulse welding techniques. The metallic tubular pieces can be formed from steel, aluminum, and the like, or any combination thereof. The storage box further includes one or more panels that are formed from composite materials, such as urethane, that are secured to the metallic storage box frame. The composite panels may secured to the metallic storage frame box by molding the composite material directly about the metallic storage box frame. Alternatively, the composite panels may be formed as separate pieces that are connected the metallic storage box frame. The combination of the internal metallic storage box frame and the external composite storage box panels provides a relatively light weight storage box that is resistant to dents and other deformations during use.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
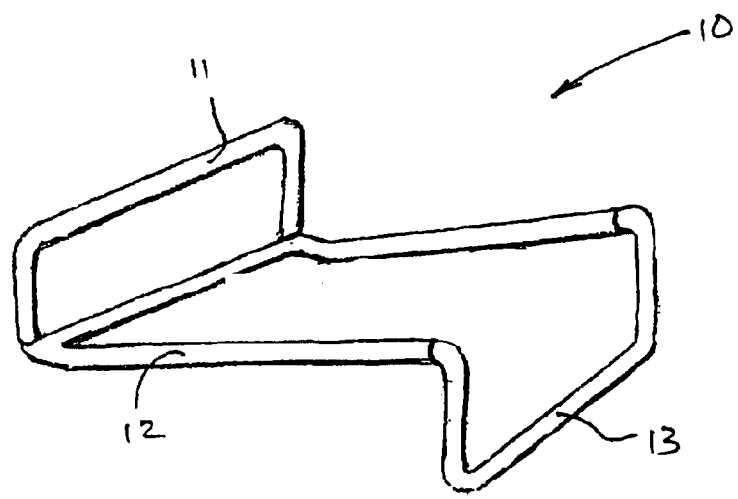
FIG. 1 is a perspective view of a first embodiment of a storage box frame that has been formed from a plurality of metallic tubular components in accordance with this invention.

Referring to the drawings, there is illustrated in FIG. 1 a first embodiment of a storage box frame, indicated generally at 10, in accordance with this invention. The storage box frame 10 is formed from a plurality of metallic components, such as the illustrated metallic tubular members 11, 12, and 13. Although this invention will be described in the context of the three illustrated metallic tubular members 11, 12, and 13, it will be appreciated that this invention may be practiced using any number of metallic members that have any desired shape or configuration, including both open channel structural members (i.e., structural members that have a non-continuous cross sectional shape, such as U-shaped or C-shaped channel members, for example) and closed channel structural members (i.e., structural members that have a continuous cross sectional shape, such as tubular or box-shaped channel members, for example). The metallic tubular members 11, 12, and 13 can be formed from any desired material or group of materials, including steel and aluminum, for example. The metallic tubular members 11, 12, and 13 can be formed or bent to desired shapes, such as shown in FIG. 1. Then, the metallic tubular members 11, 12, and 13 are secured together to form the storage box frame 10. The metallic tubular members 11, 12, and 13 can be secured together using any conventional means, including conventional welding techniques, magnetic pulse welding techniques, adhesives, and the like.

Figure 2:
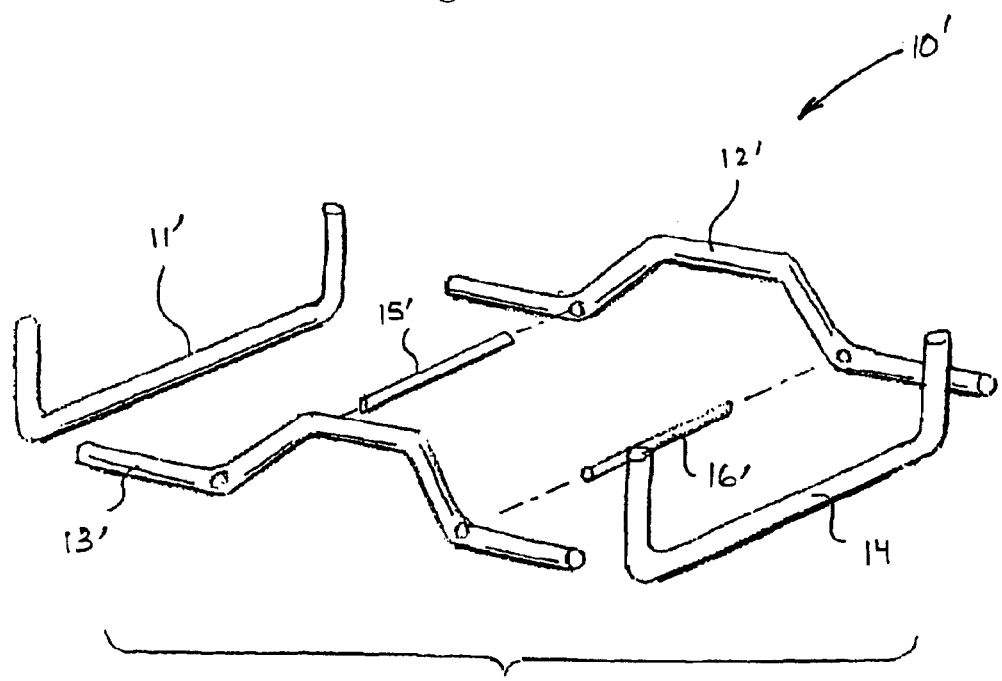
FIG. 2 is an exploded perspective view of a second embodiment of a storage box frame that has been formed from a plurality of metallic tubular components in accordance with this invention.

FIG. 2 is an exploded perspective view of a second embodiment of a storage box frame, indicated generally at 10', in accordance with this invention. The storage box frame 10' is also formed from a plurality of metallic components, such as the illustrated metallic tubular members 11', 12', 13', and 14' having a plurality of laterally extending reinforcing braces 15' and 16'. The various metallic tubular members 11', 12', 13', and 14' and reinforcing braces 15' and 16' can be formed and secured together in the manner described above to form the storage box frame 10'.

Figure 3:
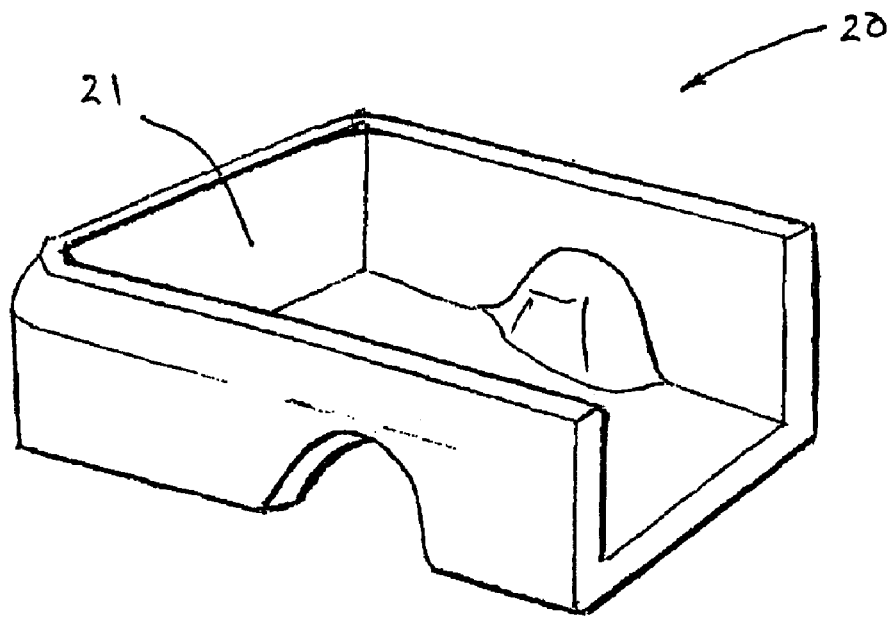
FIG. 3 is a perspective view of a first embodiment of a storage box including a single composite panel that has been molded directly about either of the metallic storage box frames illustrated in FIGS. 1 and 2.

FIG. 3 is a perspective view of a first embodiment of a storage box, indicated generally at 20, in accordance with this invention. The illustrated storage box 20 includes a single composite panel 21 that has been molded directly about either of the metallic storage box frames 10 or 10' illustrated in FIGS. 1 and 2. This can be accomplished by disposing the metallic storage box frame 10 or 10' within a mold having an internal die cavity that is shaped in the desired shape of the storage box panel 21. Then, a suitable plastic material is injected into the mold to encapsulate the storage box frame 10 or 10' and form the single composite panel 21 thereabout. Any desired composite material, such as a urethane foam, can be used to form the composite panel 21. Such composite material may, if desired, be strengthened by the addition of fibers of glass, for example. Once the composite material has sufficiently cured about the storage box frame 10 or 10' to form the composite panel 21, the storage box 20 can be assembled onto the frame assembly of the pickup truck or similar vehicle in any desired manner.

Figure 4:
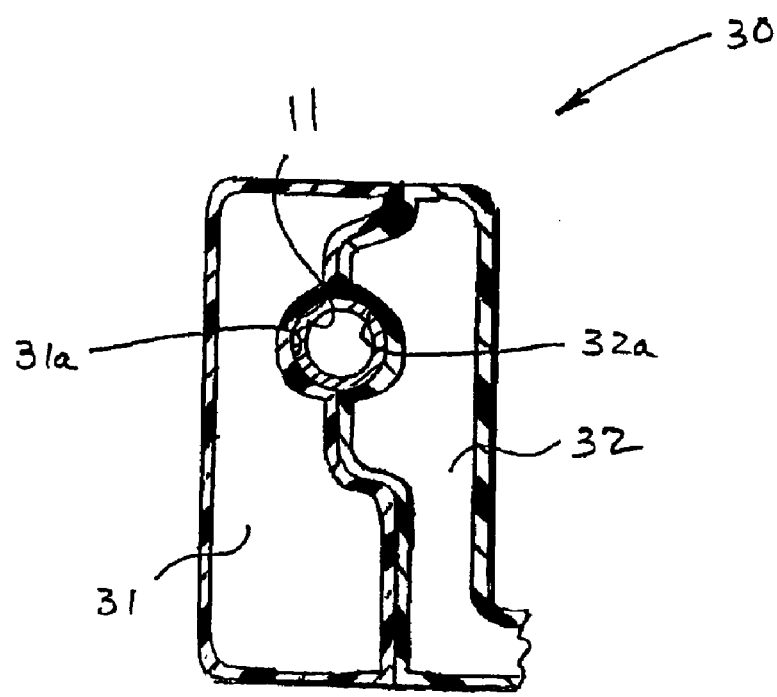
FIG. 4 is a sectional elevational view of a portion of a second embodiment of a storage box including a plurality of composite panels that have been formed as separate pieces that are connected to either of the metallic storage box frames illustrated in FIGS. 1 and 2.

FIG. 4 is a sectional elevational view of a portion of a second embodiment of a storage box, indicated generally at 30, in accordance with this invention. The illustrated storage box 30 including a plurality of composite panels (two of which are shown at 31 and 32) that have been formed as separate pieces in any conventional manner. Then, the composite panels 31 and 32 are connected to portions of either of the metallic storage box frames 10 and 10' illustrated in FIGS. 1 and 2 to form the storage box 30. The securement of the composite panels 31 and 32 to the metallic storage box frames 10 and 10' can be accomplished in any desired manner. For example, the composite panels 31 and 32 can be formed having respective recessed portions 31a and 32a that are sized and shaped to receive portions of the metallic tubular members 11, 12, and 13 therein, as shown in FIG. 4 to positively position the composite panels 31 and 32 relative to the metallic storage box frames 10 and 10'. Then, portions of the composite panels 31 and 32 can be secured to one another using any conventional means. For example, the composite panels 31 and 32 can be secured together using adhesives, threaded fasteners, and the like to form the storage box 30.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A storage box for a vehicle comprising:
    a storage box frame that is formed from a plurality of metallic components that are secured together in a preformed frame of the interconnected metallic components, each component having a cross-sectional shape; and
    one or more panels including an outer surface and an inner surface that are formed from composite materials, sized and shaped to conform to the cross-sectional shape of portions of the storage box frame, and molded directly about the metallic storage box frame, the outer surface having a desired shape of an outer surface of the storage box, the inner surface having a desired shape of an inner surface of the storage box.

2. The storage box defined in claim 1 wherein said storage box frame is formed from a plurality of metallic tubular components.

3. The storage box defined in claim 1 wherein said plurality of metallic components are secured together by magnetic pulse welding.

4. The storage box defined in claim 1 wherein said composite panel is formed as a separate piece that is molded directly about the metallic storage box frame.

5. The storage box defined in claim 1 wherein a plurality of said composite panels are formed as separate pieces that are molded directly about the metallic storage box frame.

6. The storage box defined in claim 1 wherein the composite material is urethane foam.

7. The storage box defined in claim 1 wherein the composite material is urethane foam reinforced with glass fibers.

8. The storage box defined in claim 1 wherein the panels and frame form lateral surfaces of the storage box.

9. A storage box for a vehicle comprising:
    a storage box frame that is formed from a plurality of metallic components that are secured together in a preformed frame of the interconnected metallic components, each component having a cross-sectional shape; and
    first and second panels that are each formed from a composite material and are sized and shaped to conform to the cross-sectional shape of portions of the storage box frame, and secured to the metallic storage box frame;
    the first panel including the outer surface and a intermediate surface formed with a first recess that is sized and shaped to receive a portion of the cross-sectional shape of the storage box frame within the first recess; and
    the second panel including the inner surface and a second intermediate surface formed with a second recess facing the first recess, sized and shaped to receive a second portion of the cross-sectional shape of the storage box frame within the second recess;
    wherein the outer surface having a desired shape of an outer surface of the storage box, an inner surface having a desired shape of an inner surface of the storage box.

10. The storage box defined in claim 9 wherein said storage box frame is formed from a plurality of metallic tubular components.

11. The storage box defined in claim 9 wherein said plurality of metallic components are secured together by magnetic pulse welding.

12. The storage box defined in claim 9 wherein the composite material is urethane foam.

13. The storage box defined in claim 9 wherein the composite material is urethane foam reinforced with glass fibers.

14. The storage box defined in claim 9 wherein the panels and frame form lateral surfaces of the storage box.

* * * * *